United States Patent
Prieto et al.

(10) Patent No.: US 7,120,527 B2
(45) Date of Patent: Oct. 10, 2006

(54) VEHICLE OCCUPANT CHARACTERIZATION METHOD BASED ON THE POWER SPECTRUM OF A SEAT SENSOR OUTPUT SIGNAL

(75) Inventors: Raymundo Prieto, Kokomo, IN (US); Steve J. Wagner, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/983,474

(22) Filed: Nov. 8, 2004

(65) Prior Publication Data

US 2006/0100761 A1    May 11, 2006

(51) Int. Cl.
*G01S 15/00*  (2006.01)
*G06F 17/00*  (2006.01)

(52) U.S. Cl. .................. 701/45; 280/735; 180/273

(58) Field of Classification Search .............. 701/45, 701/36, 49; 280/735, 734, 730.1; 180/273, 180/282, 268, 271; 177/209; 297/DIG. 3, 297/452.41, 195.12
See application file for complete search history.

(56) References Cited

U.S. PATENT DOCUMENTS

| | | | | |
|---|---|---|---|---|
| 3,774,938 A | * | 11/1973 | Orlando ............ | 280/735 |
| 3,832,507 A | * | 8/1974 | Marquardt et al. | ... 200/61.45 R |
| 5,256,904 A | * | 10/1993 | Tohbaru ............ | 307/10.1 |
| 5,320,409 A | * | 6/1994 | Katoh et al. ....... | 297/284.6 |
| 6,246,936 B1 | | 6/2001 | Murphy et al. ... | 701/45 |
| 6,542,802 B1 | | 4/2003 | Gray et al. ........ | 701/45 |
| 6,753,780 B1 | | 6/2004 | Li ...................... | 340/573.1 |
| 6,850,824 B1 | * | 2/2005 | Breed ................ | 701/36 |
| 2003/0004628 A1 | | 1/2003 | Rennaker et al. | |
| 2004/0114465 A1 | * | 6/2004 | Marchthaler et al. | ......... 367/93 |

FOREIGN PATENT DOCUMENTS

EP    1356999    10/2003

OTHER PUBLICATIONS

EP search report dated Mar. 10, 2006.

* cited by examiner

*Primary Examiner*—Dalena Tran
(74) *Attorney, Agent, or Firm*—Scott A. McBain

(57) ABSTRACT

The occupant of a vehicle seat is characterized by computing a power spectrum function of data obtained from a seat sensor such as a pressure sensor in a fluid-filled seat bladder or a frame-mounted vertical accelerometer. The spectrum function is integrated over a specified frequency range, and compared to a threshold value that is calibrated to compensate for vehicle speed related variability. The presence of a cinched child seat is indicated when the threshold is exceeded, and the presence of a normally seated adult is indicated otherwise.

6 Claims, 3 Drawing Sheets

VEHICLE OCCUPANT CHARACTERIZATION METHOD BASED ON THE POWER SPECTRUM OF A SEAT SENSOR OUTPUT SIGNAL

TECHNICAL FIELD

The present invention relates to characterizing the occupant of a vehicle seat, and more particularly to a method of dynamically distinguishing between an adult occupant and a cinched child seat.

BACKGROUND OF THE INVENTION

It is important to accurately and reliably characterize the occupant of a vehicle seat in order to properly control the operation of air bags and other pyrotechnically deployed restraints. For example, the deployment of such restraints is generally allowed when the seat is occupied by an adult, but suppressed when the seat is occupied by a portable infant seat or child seat (referred to herein collectively as child seats). A common way of characterizing an occupant is to equip the vehicle seat with one or more weight or force responsive sensors, and to compare the sensed weight or force with calibrated thresholds. However, similar weight or force measurements occur for both an adult occupant and a child seat that is placed on the vehicle seat and cinched down with a seat belt anchored to the vehicle floor.

The U.S. Pat. No. 6,246,936 to Murphy et al. teaches that it is possible to distinguish between an adult occupant and a cinched child seat by calculating a variance of the measured occupant weight during movement of the vehicle. If the variance is below a threshold for a predetermined interval, the occupant is characterized as a child seat, since a tightly cinched seat belt severely restricts variance. If the variance exceeds the threshold for a predetermined interval, the occupant is characterized as an adult. Murphy et al. also disclose that the frequency of the measured occupant weight can be used as a correlative factor, as the frequency is higher for a cinched child seat than for a normally seated adult. In a similar vein, the U.S. Pat. No. 6,542,802 to Gray et al. teaches normalization of the measured weight variance based on a measure of the vehicle's vertical acceleration in order to compensate for disturbances such as driving on a rough road. Since the use of correlative measurements can significantly increase system cost, what is desired is a way of reliably characterizing the seat occupant with a single seat sensor.

SUMMARY OF THE INVENTION

The present invention is directed to an improved vehicle seat occupant characterization method where the output signal of a single seat sensor, such as a pressure sensor in a fluid-filled seat bladder or a frame-mounted vertical accelerometer, is subjected to power spectrum analysis to determine the fractional signal power within a specified frequency range, and the determined signal power is compared to a threshold value that is calibrated to compensate for vehicle speed related variability. The presence of a cinched child seat is indicated when the threshold is exceeded, and the presence of a normally seated adult is indicated otherwise.

DESCRIPTION OF THE PREFERRED EMBODIMENT

Figure 1A:
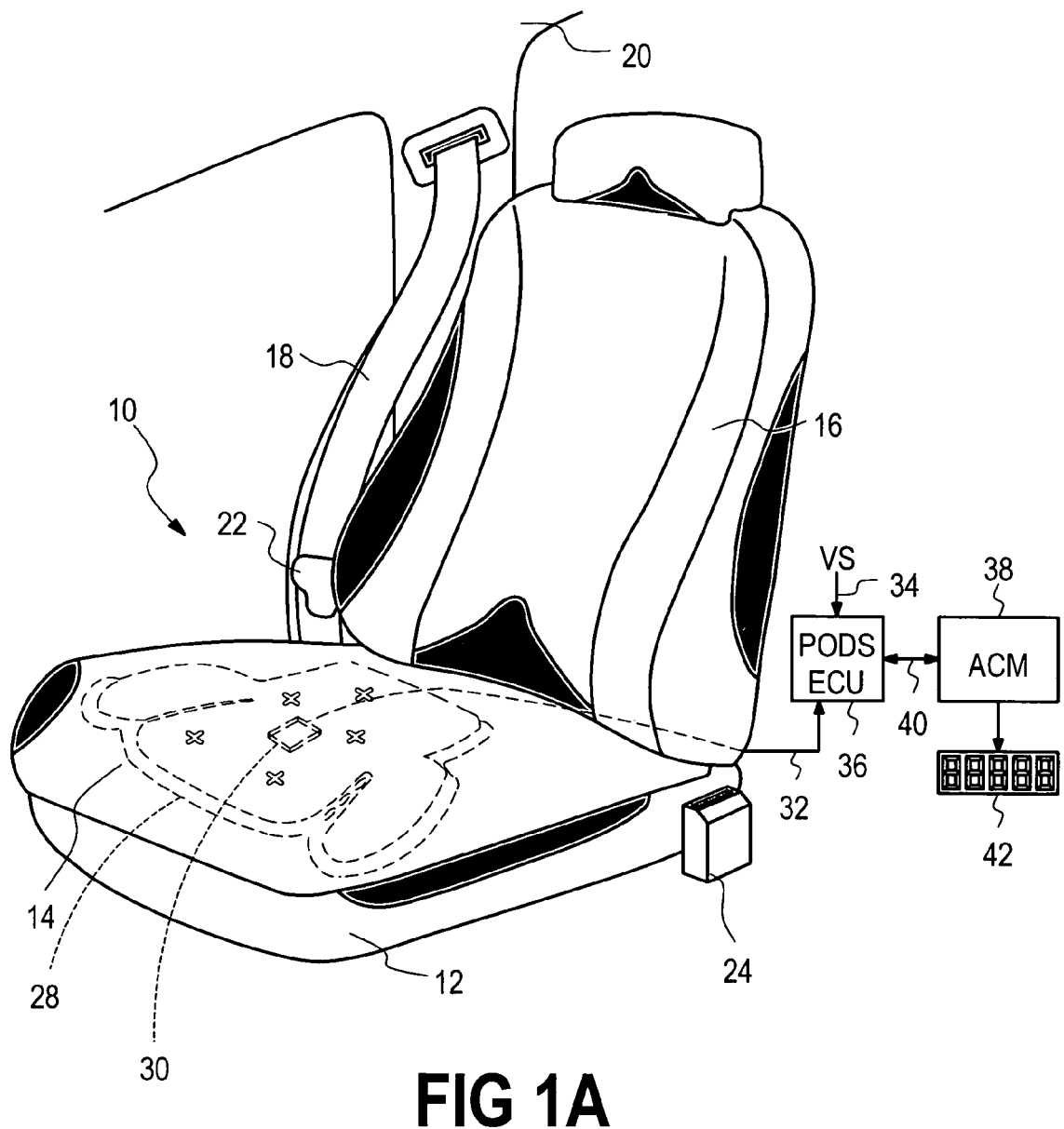
FIGS. 1A and 1B depict alternate vehicle seat occupant sensing systems for carrying out the method of the present invention. In the system of FIG. 1A, the seat is equipped with a fluid-filled seat bladder, and the output of a pressure sensor coupled to the bladder is supplied to a passive occupant detection electronic control unit (PODS ECU) that carries out the method of this invention. In the system of FIG. 1B, the seat is equipped with a frame-mounted vertical accelerometer, whose output is supplied to the PODS ECU.
Figure 1B:
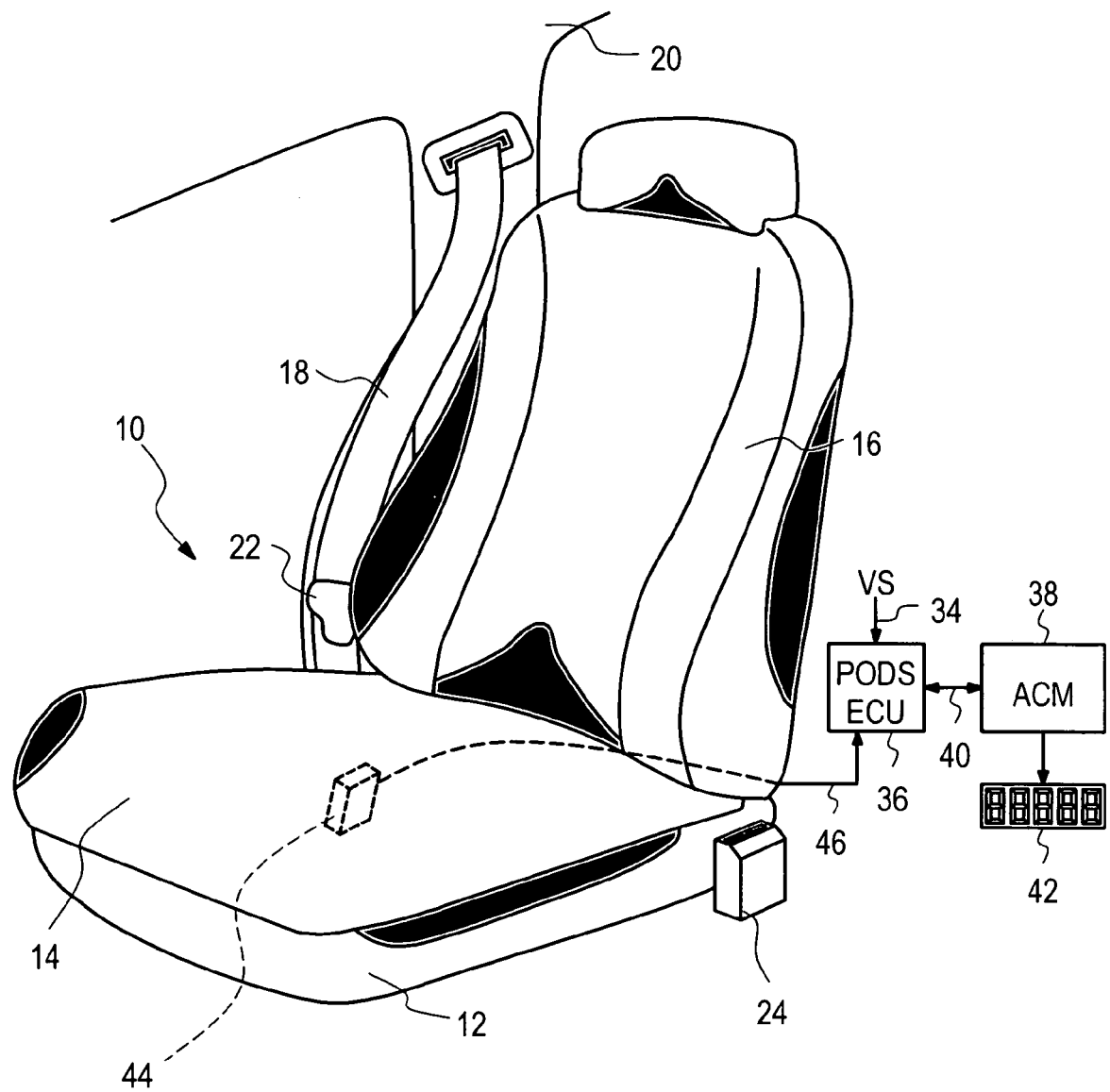

FIGS. 1A and 1B depict alternate embodiments of an occupant sensing system for use with the method of the present invention. FIGS. 1A–1B both depict a vehicle seat 10 supported on a frame 12, with foam cushions 14 and 16 on the seat bottom and back, and in each case, the seat 10 is equipped with a conventional shoulder/lap seat belt 18 anchored to the vehicle floor (not shown) and B-pillar 20. In use, the belt 18 is drawn around an occupant or through the frame of a child or infant seat, and a clip 22 slidably mounted on the belt 18 is inserted into the buckle 24 to fasten the belt 18 in place. A retractor assembly (not shown) mounted in the B-pillar 20 maintains a desired tension on the belt 18, and locks the belt 18 in place when the vehicle experiences significant deceleration.

The system depicted in FIG. 1A includes a fluid-filled bladder 28 and a pressure sensor 30 for detecting the seated weight of an occupant. The bladder 28 is disposed in or under the foam cushion 16 substantially parallel with the central seating surface, and the pressure sensor 30 provides an electrical output signal on line 32 indicative of the fluid pressure in the bladder 28. The pressure signal on line 32 and a vehicle speed signal (VS) on line 34 are supplied as inputs to a passive occupant detection system electronic control unit (PODS ECU) 36. The vehicle speed signal may be generated with a dedicated speed sensor, but is preferably is obtained from a data bus interconnecting various powertrain and chassis electronic control units of the vehicle. The PODS ECU 36 is coupled to an airbag control module (ACM) 38 via bi-directional communication bus 40. The ACM 38 may be conventional in nature, and operates to deploy one or more airbags or other restraint devices (not shown) for vehicle occupant protection based on detected vehicle acceleration and occupant characterization data obtained from PODS ECU 36. In general, ACM 38 deploys the restraints if the acceleration signals indicate the occurrence of a severe crash, unless the PODS ECU 36 indicates that deployment should be suppressed. Of course, other more sophisticated controls are also possible, such as controlling the deployment force of the restraints based on the occupant characterization data provided by PODS ECU 36. Also, ACM 38 communicates the suppression status to a driver display device 42 to enable the driver to verify that the system has properly characterized the seat occupant.

The system depicted in FIG. 1B includes an accelerometer 44 responsive to vertical or z-axis acceleration of the seat frame 12 beneath the seat occupant. For example, the frame 12 may include a metal seat pan that supports the bottom cushion 16, and the accelerometer 44 may be rigidly secured to a bracket welded to a central portion of the seat pan. The accelerometer 44 produces an electrical acceleration signal on line 46, which is supplied to PODS ECU 36 along with the vehicle speed signal on line 34. In other respects, the system depicted in FIG. 1B is like the system depicted in FIG. 1A.

The primary function of PODS ECU 36 is to characterize an occupant of seat 10 based on the various input signals mentioned above, and to determine whether deployment of the inflatable restraints should be allowed or suppressed. The present invention is specifically directed to a characterization method carried out by the PODS ECU 36 for reliably distinguishing between a child seat that is cinched down with seat belt 18 and a normally seated adult based on a power spectrum analysis of the pressure signal on line 32 (FIG. 1A) or the acceleration signal on line 46 (FIG. 1B). In general, the PODS ECU 36 determines the fractional power amount within a specified frequency range, and the determined fractional power amount is compared to a threshold value that is calibrated as a function of vehicle speed.

Figure 2:
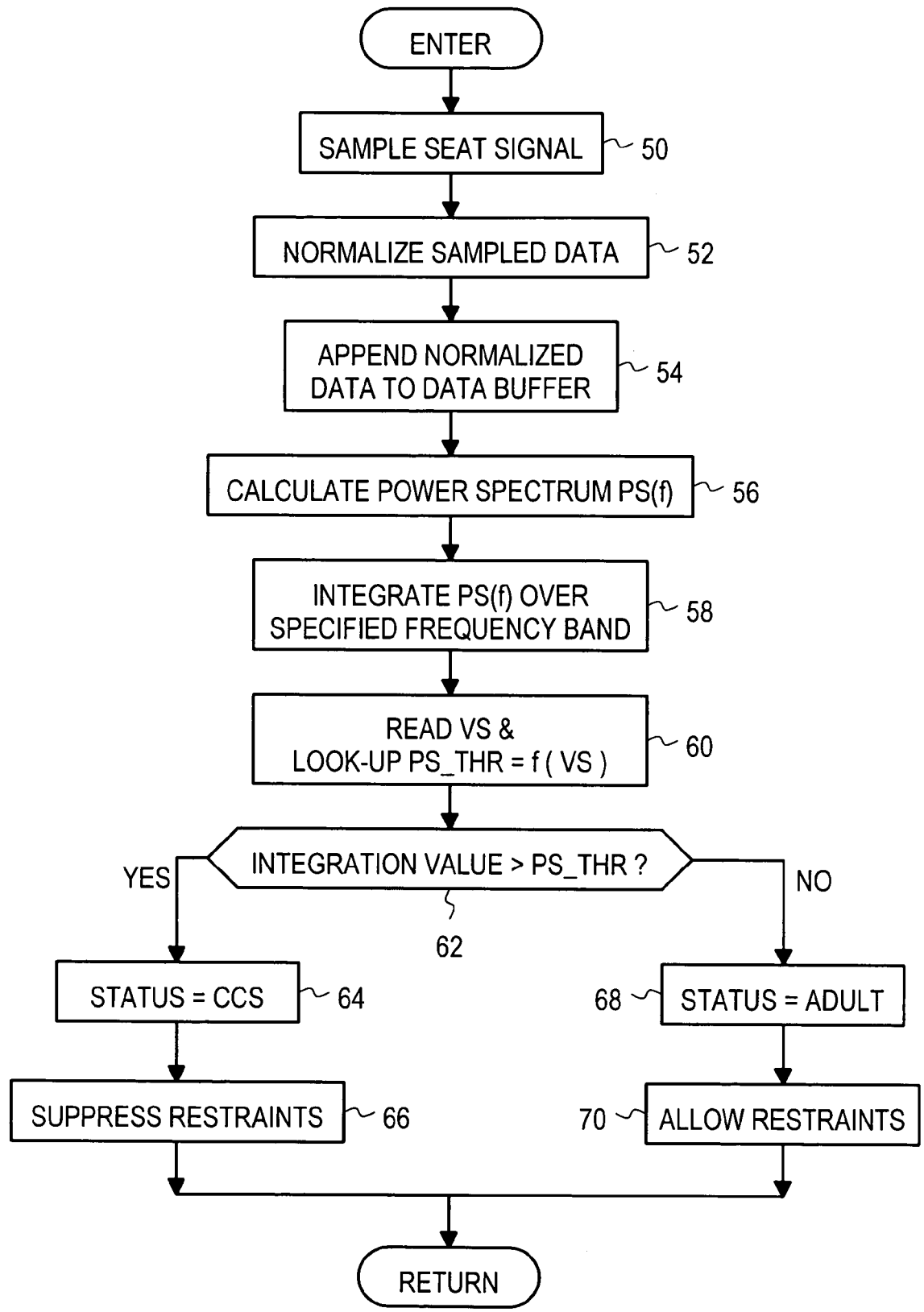
FIG. 2 is a flow diagram representing a software routine executed by the PODS ECU of FIGS. 1A and/or 1B according to this invention.

FIG. 2 depicts a flow diagram representative of a software routine periodically executed by PODS ECU 36 for carrying out the method of the present invention. At block 50, the PODS ECU 36 samples the seat signal, whether the pressure signal on line 32 or the acceleration signal on line 46. For example, the PODS ECU 36 may include an analog-to-digital converter that repeatedly samples the respective input signal over an interval such as one second, and stores the sampled data in a first data buffer. At block 52, the stored data is normalized by subtracting out the average signal value to remove the DC component, and scaling the remaining AC component so that the entire signal lies in the range of −1.0 to +1.0. At block 54, the normalized data is appended to a second data buffer capable of retaining several such packets of data.

Once the second data buffer has been filled, the block 56 is executed to calculate a power spectrum function PS(f) of the stored data. The power spectrum function PS(f) is used to determine the harmonic power of the stored data, and is calculated as the square of the absolute value of the Fourier transform of the data, or:

$$PS(f) = |F\{x(t)\}|^2$$

where x(t) is the signal defined by the stored data and F{x(t)} is the Fourier transform of the signal at a specified frequency f.

At block 58, the PODS ECU 36 integrates the power spectrum function PS(f) over a specified range of frequencies. The specified frequency range is calibrated to distinguish the data observed with a cinched child seat from the data observed with a normally seated adult of similar apparent weight. In general, the seat data obtained when the occupant is a cinched child seat exhibits a significantly greater harmonic content than the data obtained when the occupant is a normally seated adult. The specified frequency range of block 58 is determined by calibration, and is simply the frequency range over which the difference in harmonic content is greatest. In implementing the method of the present invention, the power spectrum signal was integrated over a frequency range of 10 Hz to 50 Hz for a pressure-based system such as depicted in FIG. 1A, and over a frequency range of 50 Hz to 100 Hz for an acceleration-based system such as depicted in FIG. 1B. At block 60, the PODS ECU 36 reads the vehicle speed signal (VS) and looks up a calibrated power spectrum threshold PS_THR stored as a function of vehicle speed. In general, the seat signals are influenced by vehicle speed, and calibrating the power spectrum threshold PS_THR as a function of VS allows the calibrator to compensate for variability of the integration value due to the effects of vehicle motion at different speeds of the vehicle. Block 62 compares the integration value determined at block 58 to the threshold PS_THR. If the integration value exceeds PS_THR, the presence of cinched child seat is indicated, and the blocks 64 and 66 are executed to set the term STATUS to CCS (Cinched Child Seat) and to suppress deployment of the restraints. Otherwise, the presence of an adult is indicated, and the blocks 68 and 70 are executed to set STATUS to ADULT and to allow deployment of the restraints.

In summary, the present invention provides a simple and cost-effective method for accurately and reliably characterizing a vehicle seat occupant with a single seat sensor. While the method has been described with respect to the illustrated embodiment, it is recognized that numerous modifications and variations in addition to those mentioned above will occur to those skilled in the art. For example, a different kind of occupant sensing system such as a system including a seat pressure sensor pad or a strain-based frame sensor may be used in place of the illustrated occupant sensing systems; the power spectrum function may be integrated over a plurality of frequency ranges; and so on. Accordingly, it is intended that the invention not be limited to the disclosed embodiment, but that it have the full scope permitted by the language of the following claims.

The invention claimed is:

1. A method of characterizing an occupant of a vehicle seat, comprising the steps of:
   sampling an output signal of a sensor affixed to said seat to construct a digital occupant characterization signal;
   calculating a power spectrum function of said occupant characterization signal;
   integrating said power spectrum function over a specified frequency range to form an integration value;
   retrieving a calibrated threshold based on measure of vehicle speed; and
   comparing said integration value to said calibrated threshold;
   characterizing said occupant as a cinched child seat when said integration value is above said threshold; and
   characterizing said occupant as a normally seated adult when said integration value is below said threshold.

2. The method of claim 1, including the step of:
   removing a DC component of the sampled output signal so that said digital occupant characterization signal represents a variation of said output signal.

3. The method of claim 1, wherein said sensor is a pressure sensor coupled to a fluid filled seat bladder, and said specified frequency range is defined by a lower frequency of about 10 Hz and an upper frequency of about 50 Hz.

4. The method of claim 1, wherein said sensor is an accelerometer affixed to a central frame element of said seat.

5. The method of claim 4, wherein said specified frequency range is defined by a lower frequency of about 50 Hz and an upper frequency of about 100 Hz.

6. The method of claim 1, wherein said threshold is calibrated to compensate for variability of said integration value due to effects of vehicle motion at different speeds of said vehicle.

* * * * *